(12) United States Patent
Hall et al.

(10) Patent No.: US 7,546,901 B1
(45) Date of Patent: Jun. 16, 2009

(54) INERT GAS BLANKET FOR PROTECTION FROM OXIDATION

(75) Inventors: Richard H. Hall, 1187 E. Stewart Rd., Midland, MI (US) 48640; Theodore W. Selby, Midland, MI (US)

(73) Assignee: Richard H. Hall, Midland, MI (US)

( * ) Notice: Subject to any disclaimer, the term of this patent is extended or adjusted under 35 U.S.C. 154(b) by 1925 days.

(21) Appl. No.: 09/172,577

(22) Filed: Oct. 13, 1998

Related U.S. Application Data

(60) Provisional application No. 60/062,133, filed on Oct. 15, 1997.

(51) Int. Cl.
*F16N 39/00* (2006.01)
(52) U.S. Cl. .................................. 184/6.21; 184/6.22
(58) Field of Classification Search ............... 184/6.24, 184/6.21, 106; 422/40, 41; 95/47; 96/10; 74/606 A
See application file for complete search history.

(56) References Cited

U.S. PATENT DOCUMENTS

| | | | | | |
|---|---|---|---|---|---|
| 2,623,186 | A | * | 12/1952 | Wilde | 74/606 A |
| 3,617,580 | A | * | 11/1971 | Elizabeth | 210/60 |
| 3,751,699 | A | * | 8/1973 | Gleichman | 184/6 |
| 3,777,928 | A | * | 12/1973 | Kober | 220/88 B |
| 3,792,578 | A | * | 2/1974 | Hetzel | 74/606 A |
| 3,899,099 | A | * | 8/1975 | Oiestad | 220/88 B |
| 3,982,395 | A | * | 9/1976 | Hasegawa et al. | 60/278 |
| 4,066,401 | A | * | 1/1978 | Solomon | 21/61 |
| 4,393,922 | A | * | 7/1983 | Bahrle et al. | 123/41.33 |
| 4,400,123 | A | * | 8/1983 | Dunegan | 184/1 R |
| 4,414,861 | A | * | 11/1983 | Witt | 74/606 A |
| 4,561,393 | A | * | 12/1985 | Kopel | 123/90.48 |
| 4,594,080 | A | * | 6/1986 | Tremain et al. | 55/179 |
| 4,601,840 | A | * | 7/1986 | Zehler et al. | 184/6.26 |
| 5,052,988 | A | | 10/1991 | Ishikawa et al. | |
| 5,062,447 | A | | 11/1991 | Davison, Jr. et al. | |
| 5,284,223 | A | | 2/1994 | Fisher | |
| 5,591,020 | A | * | 1/1997 | Rockwood | 184/6.26 |

(Continued)

FOREIGN PATENT DOCUMENTS

JP 02082304 A * 3/1990

OTHER PUBLICATIONS

<www.baat.com/superbat/prod01.htm> Titled "Metal Treatment Additive" under the heading of "Welcome to Superbat" See p. 2 line 18 (or 6$^{th}$ bullet mark) for the disclosure of extending interval between oil changes.*

(Continued)

*Primary Examiner*—David M Fenstermacher
(74) *Attorney, Agent, or Firm*—Christopher John Rudy; Andrew Joseph Rudy

(57) ABSTRACT

Inert gas blanket protects oxidatively labile substance from oxidation. For example, fuels and lubricants such as present in fuel tanks, bearings, crankcases, gear boxes, transmissions, and so forth, employed in or in conjunction with internal combustion, jet and turbine engines, or a combustible substance such as flour dust in a grain silo, can be protected with a nitrogen blanket provided from the separation of air with a membrane containing device. Useful life of oleaginous liquids and hydrocarbon-based lubricants can be extended. For example, with the practice of the present invention, it may be necessary to change automobile engine oil only after twenty to fifty thousand miles of use.

19 Claims, 2 Drawing Sheets

U.S. PATENT DOCUMENTS 5,622,156 A    4/1997   Rose et al.
5,649,995 A *  7/1997   Gast, Jr. .......................... 95/10
5,794,602 A    8/1998   Kimura
5,852,992 A    12/1998  Boggs et al.

OTHER PUBLICATIONS

Murray's Discount Auto Stores, Flier (Michigan, Chicago): Fuel Watch (Jul. 2001).

Lube Report, vol. 2, Iss. 9, Feb. 27, 2002, "Toyota to Cover Oil Gelation Damage."

CleanTech, Jul./Aug. 2002, p. 6, "Prognosis Clean."

Lubricants World, Mar. 2002, p. 6 "Toyota Already Giving Oils a Boost?"

Toyota, Apr. 2002, Letter to Toyota Dealer.

* cited by examiner

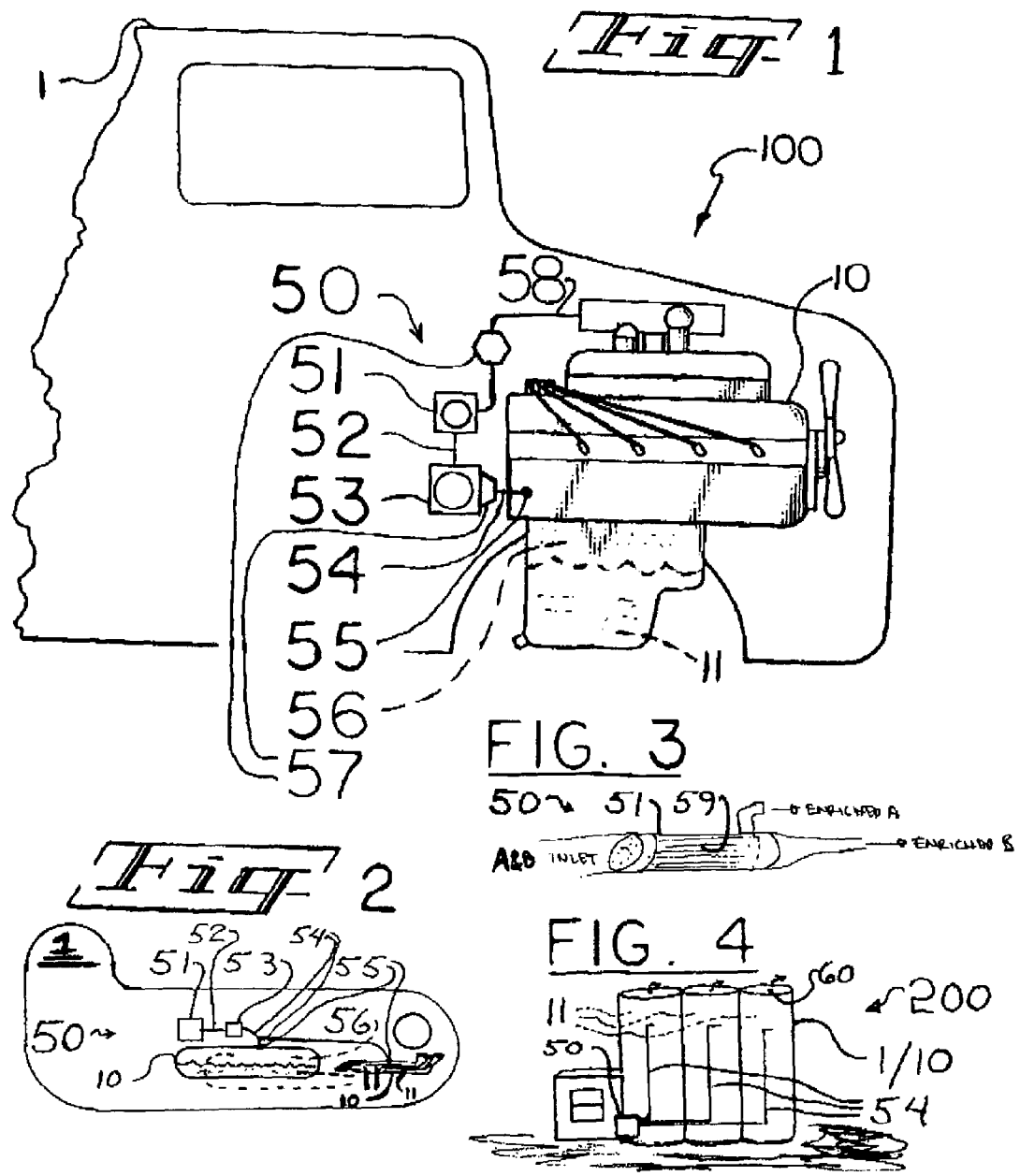

INERT GAS BLANKET FOR PROTECTION FROM OXIDATION

This claims the benefit of U.S. provisional patent application Ser. No. 60/062,133 filed Oct. 15, 1997.

FIELD

This invention concerns provision of a non-oxidizing gas blanket, for protection from oxidation, to include, for example, for fuels and lubricants such as present in fuel tanks, bearings, crankcases, gear boxes, transmissions, and so forth, used in or in conjunction with internal combustion, jet and turbine engines. Protection from combustion in enclosed spaces, to include wiring raceways, and explosion with other explosive mixtures are also of concern, for example, in static building structures containing carbonaceous particulate matter which may become suspended in air and can present a safety problem, for example, silos or buildings which contain grain, flour, and so forth and the like.

BACKGROUND

One of the primary enemies of longevity in hydrocarbon-based lubricants is oxidation. For example, engine oils employed in automobiles, transportation and stationary power units break down significantly owing to oxidation and must be replaced every few thousand miles, or after a certain number of hours, of use.

As well, oxidation can be a foe of safety when it comes to fuel tank explosions and so forth. For example, automobiles under crash conditions may encounter such explosions; aircraft fuel tanks have been known to explode, and the wiring of aircraft may start on fire. Ship tankers carrying fuels are particularly at risk, and most are now "inerted" when traveling unloaded. Railroad tank cars and tank trucks are also of concern. In tanked vehicles, flue gas, rich in carbon dioxide, may be piped to the tank to hopefully protect its contents if an explosive condition would exist due to the presence of a fuel and oxygen.

Furthermore, the dumping of used oil is one of the major sources of pollution in landfills. Moreover, harmful substances accompanying the used oil are carried into the landfills.

Further, static building structures containing carbonaceous particulate matter which may become suspended in air can present a safety problem. For example, silos or buildings which contain grain, flour and/or other carbonaceous particulate matter such as may be provided by sawdust have been known to explode. In addressing this matter, silo explosion detectors are known, which detect an explosion at its onset and inject HALON®/FREON® gas therein to hopefully minimize or alleviate explosive wave front propagation. However, such systems are not without their drawbacks.

It would be desired to overcome or ameliorate such problems.

SUMMARY

The invention provides an inert gas blanket for protection from oxidation. Such includes, for example, for fuels and lubricants such as present in fuel tanks, bearings, crankcases, gear boxes, transmissions, and so forth, employed in or in conjunction with internal combustion, jet and turbine engines.

The invention is useful in conservation and public safety.

Significantly by the invention, the useful life of oleaginous liquids and hydrocarbon-based lubricants can be extended to most amazing lengths. For example, with the practice of the present invention, it may be necessary to change automobile engine oil only after twenty to fifty thousand miles of use or more. As well, by the invention, less and less oil will find its way into landfills since the major reason so much oil is found unsuitable for use and is dumped is due to the oil becoming oxidized; the oxidation of oil generates organic acids, ketones, aldehydes and other varnish-like and/or corrosive compounds, which, in general, must be dumped while still dissolved or suspended in the oil, or cause damage to the operating mechanism which the oil lubricates. The retardation of the process of forming these components, i.e., the oxidation, will not only minimize the consumption of oil such as will be drained and dumped by the consumer, which is of real economic value to him, but also will provide for a reduced load on the environment in waste handling and disposal of the used oil, which can be estimated in millions of gallons per year. In addition, the likelihood of fuel tank explosions in air, land and sea vehicles and stationary machinery, and as well the likelihood of electrical fires in wiring raceways as found in aircraft, can be effectively reduced. Furthermore, buildings such as grain or flour silos, sawdust containing buildings, etc., can be inhibited from explosion. The invention is simple; it is inexpensive to implement, and it is efficient.

Numerous further advantages attend the invention.

DRAWINGS

The drawings form part of the specification hereof. With respect to the drawings, where like numerals indicate like features, the following is briefly noted:

FIG. 1 is a plan view of an inert gas blanket provision of the invention for protection of engine oil in an internal combustion engine in an automobile.

FIG. 2 is a plan view of inert gas blankets of the invention for protection of a fuel tank and a wire raceway in an airplane.

FIG. 3 is a plan view of an inert gas providing membrane separator, which can be used in the practice of the invention.

FIG. 4 is a plan view of an inert gas blanket provision of the invention for protection of a flour silo.

ILLUSTRATIVE DETAIL

The invention can be further understood by the present detail which may be read in view of the drawings. The same is to be taken in an illustrative and not necessarily limiting sense.

Herein, in general, in reference to a gas, the term "inert" means non-oxidizing. Generally so, an "inert gas blanket" is a non-oxidizing gas blanket. Preferred is a nitrogen-enriched gas.

Figure 1A:
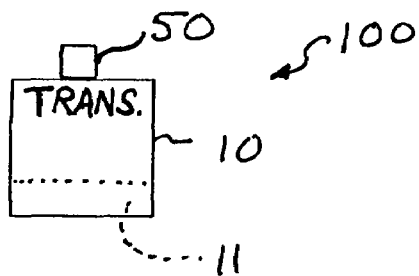
FIGS. 1A & 1B show inert gas blanket provisions of the invention for a transmission and a gear box not a transmission, respectively.
Figure 1B:
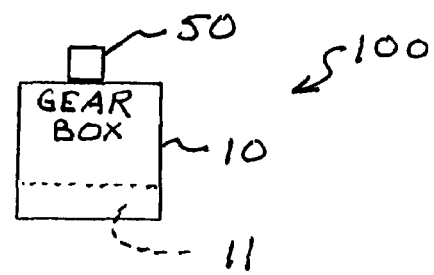

In reference to the drawings, in general, in FIGS. 1 & 2, protected machinery 100 is depicted, which includes housing 1 and generally enclosed device 10 having oxidatively labile substance 11 therein. For example, in FIG. 1 is depicted protected automobile 100 having body 1, internal combustion engine 10, which may be diesel or gasoline powered, and lubricating motor oil 11; in FIG. 1A is depicted protected transmission 100 having transmission case 10 and within it transmission fluid 11; in FIG. 1B is depicted protected gear box 100 having differential case 10 and within it lubricant 11; in FIG. 2 is depicted protected airplane 100 having body 1, and amidship, fuel tank 10 and fuel 11, and fore, electrical wire raceway 10 containing electrical wire 11 having combustible insulation and so forth. Inert gas providing device 50 can provide the inert gas blanket for protection from oxidation of the oxidatively labile substance 11. The device 50 can take the form of an inert gas tank such as pressurized or liquid argon, nitrogen and/or carbon dioxide, and so forth and the like, or any other device which can provide inert gas to the device 10 so as to protect the substance 11 from oxygen or at least high concentrations of oxygen such as found in ambient air. As an alternative, the device 50 may generate the inert gas as, for example, a nitrogen blanket or at least a gas blanket having enriched concentrations of nitrogen in comparison to ambient air such as through employment of membrane technology and so forth. As such, and as not only generally depicted in FIGS. 1 & 2 but also depicted in FIG. 3, the device 50 may include membrane separating device 51, which can separate air into a plurality of fractions, for example, two fractions, one containing an enriched supply of nitrogen, the other having an enriched supply of oxygen as a byproduct, and such a device may be of the pressurized hollow fiber membrane type so as to enable economical separation; first conduit 52 leads from the nitrogen enriched side of the device 51 to pump 53, which may be, for example, of the type commonly employed in compressed air, enhanced shock absorbers used for level control or for light trucks, of be of another suitable variety; second conduit 54 leads from the pump 53 to fitting 55 leading to the interior of the engine or fuel tank 10 where inert gas blanket 56, for example, of the gas enriched with nitrogen, is provided. The pump 53, and optional small reservoir storage tank 57 for storage of inert gas and/or for byproduct gas, as appropriate, can be placed in any suitable position on, in, or in association or conjunction with the protected machinery 100. With tube-type membrane gas separators, since they typically operate better under a high pressure inlet stream, the inlet of the separating device 51 is placed at the outlet of the pump 53. Optionally, by-product gas, say, enriched with oxygen, may be delivered to another part of the machinery where it can be consumed, for example, to a catalytic converter assembly, a fuel injector assembly, or, as depicted in FIG. 1, to an air cleaner assembly for intake to the carburetor, through third conduit 58. In the former case, an advantageous feature of providing the byproduct gas enriched in oxygen thereto is that it can be used in the initial starting of an internal combustion engine when the catalytic converter is otherwise at its minimum activity, or, in other words, its maximum pollutant generation, level, so as to alleviate the same. Another advantage of using the byproduct enriched oxygen stream is to enhance the loss of oxygen in a sealed cabin space such as that found in aircraft or even in the passenger compartment of a boat, automobile or truck. The device 50 may provide argon or carbon dioxide from air by use of a membrane.

In general, as is known in the art, membrane separators, which can include the membrane separator 50, work on the following principles:

For fluids, rolled film sheets are used.

For gasses, fine microfiber tubes 59 are used (FIG. 3).

Desirably, the tubes 59 are small in diameter so as to allow higher pressure differentials on opposing sides of the membrane. The cylindrical shape is extrudable for cost reasons and allows for side wall thickness control.

The membranes are semipermeable, and the semipermeable membrane units can be large to provide adequate volume throughput. Alternatively, they may be provided in series to provide high efficiency, high percentage separations, i.e., purer exit streams.

The rolled film units are more often used for liquids since the weight of product passing through, as can be measured by its density, is greater, but mainly because some part of the fluid, for example, entrained salts, must flushed through, or else that part will block the film. In the example of FIG. 3, both "A" and "B" streams are gasses. Therefore, there will be no deposits or blinding of the membrane, if the gasses are properly filtered at the inlet end.

For dirty, or dusty, areas, an inlet end particulate filter (not illustrated) is desirable. The filter can have an automatic backflush feature on pressure drop indication.

Various membranes may be commercially obtained and used as is or adapted for use in the practice of the invention. For example, membrane-based, nitrogen enhancing technology is available from MG Generon of Malvern, Pa.

In reference to FIG. 4, in general, protected enclosed static structure 200 includes housing 1 and generally enclosed structure 10 having oxidatively labile substance 11 therein. For example, the oxidatively labile substance may be flour dust suspended in otherwise ambient air. The membrane separating device 50 can be provided proximate the silo 200, with, for example, a nitrogen enriched supply of inert gas pumped inside the silo 200 through conduit 54 to help protect from explosion, and byproduct gas enriched in oxygen diverted elsewhere outside the silo 200. Internal pressure relief opening and/or valve 60 may be provided.

The device 50 may be retrofitted to a standard, generally enclosed device 10 to provide the protected machinery 100 or static structure 200. For an illustrative example, such may be adapted especially for and made available in the automotive aftermarket for retrofitting with a standard automotive engine, or adapted especially for and made available in the heavy machinery market for retrofitting standard locomotive, farm tractor, over the road truck, or ship engines. Along such lines, such may be applied within a standing grain or flour silo complex so as to provide an inexpensive source of non-oxidizing gas to help prevent explosions of suspended flour dust. Additional examples of the protected machinery 100 can include liquid fuel tanks, transmissions, gear boxes, hydraulic brake systems and/or wire raceways of electrical, gasoline or diesel powered watercraft, land motor vehicles, locomotive railroad engines, farm machinery, home gardening tractors and lawn mowers, commercial or industrial and home electrical generators, welders, and so forth; truck, railroad or ship tank cars, trailers or bays for fuels or combustible or oxidation sensitive reactants or solvents; stationary farm, industrial and home tanks for gasoline, diesel, oil, combustible or oxidation sensitive reactants or solvents; and so forth and the like.

In general, the invention may apply to any system in which a substantially enclosed space or a space to which an overpressure can be applied contains an oxidizable material. The actual possibilities of application of the invention are extensive.

CONCLUSION

The present invention is thus provided. Various features, subcombinations and combinations of the invention may be practiced with or without reference to other features, subcombinations or combinations in the practice of the invention, and numerous adaptations and modifications can be effected within its spirit, the literal claim scope of which is particularly pointed out as follows:

We claim:

1. A method for controlling oxidative degradation of an oleaginous liquid substance in a generally enclosed, vented space in a working machine, which comprises providing said working machine having said space; providing said oleaginous liquid substance; and blanketing said oleaginous liquid substance in said space with an inert gas blanket to control oxidative degradation of said oleaginous liquid substance, wherein said oleaginous liquid substance is selected from the group consisting of an oil and a transmission fluid, and said machine is selected from the group consisting of a transmission box, a gear box that is not a transmission box, and an internal combustion engine having a crankcase for holding a supply of lubricant and wherein said oleaginous substance is present in the crankcase as the lubricant.

2. The method of claim 1, wherein said inert gas of said inert gas blanket is provided from separation of air with a membrane-containing device.

3. The method of claim 2, wherein said oleaginous liquid substance is an engine oil; said machine is said internal combustion engine, and it is necessary to change the engine oil of the crankcase owing to the control of oxidative degradation of the engine oil, and the engine oil is changed, only after at least twenty thousand miles of use in said internal combustion engine, whereas, without the presence of said inert gas blanket, the engine oil would present properties of needing to be changed after a few thousand miles of use in said internal combustion engine in comparison to the engine oil protected by said blanket after said at least twenty thousand miles.

4. The method of claim 1, wherein said working machine is selected from the group consisting of said transmission box and said gear box.

5. The method of claim 4, wherein said insert gas of said inert gas blanket is provided from separation of air with a membrane-containing device.

6. The method of claim 2, wherein gas enriched with nitrogen provides said inert gas blanket, and by-product gas enriched with oxygen is delivered for consumption to a location selected from the group consisting of a part of the machine other than said enclosed space, and a passenger cabin space.

7. A method for controlling oxidative degradation of an engine oil in a crankcase of an internal combustion engine, which comprises providing said engine; providing said engine oil to said crankcase; and blanketing said engine oil in said crankcase with an inert gas blanket to control oxidative degradation of said engine oil.

8. The method of claim 7, wherein it is necessary to change the engine oil of said crankcase owing to the control of oxidative degradation of said engine oil, and said engine oil is changed, only after at least twenty thousand miles of use in said internal combustion engine, whereas, without the presence of said inert gas blanket, the engine oil would present properties of needing to be changed after a few thousand miles of use in said internal combustion engine in comparison to the engine oil protected by said blanket after said at least twenty thousand miles.

9. The method of claim 8, wherein it is necessary to change the engine oil of said crankcase owing to the control of oxidative degradation of said engine oil, and said engine oil is changed, only after at least fifty thousand miles of use in said internal combustion engine, whereas, without the presence of said inert gas blanket, the engine oil would present properties of needing to be changed after a few thousand miles of use in said internal combustion engine in comparison to the engine oil protected by said blanket after said at least fifty thousand miles.

10. The method of claim 9, wherein said inert gas of said inert gas blanket is provided from separation of air with a membrane-containing device.

11. A method for controlling oxidative degradation of an engine oil in a crankcase of an internal combustion engine and delivering oxygen to a place away from said crankcase, which comprises providing said engine; providing said engine oil to said crankcase; providing a means for supplying an inert gas blanket of a gas enriched with nitrogen in comparison to air, which separates nitrogen and oxygen from the air to provide said inert gas blanket and provide a by-product gas enriched in oxygen; providing a means for directing said inert gas blanket to said crankcase, and blanketing said engine oil in said crankcase with said inert gas blanket to control oxidative degradation of said engine oil; and providing a means for directing said by-product gas to the place away from said crankcase.

12. The method of claim 11, wherein the place away from said crankcase to which said by-product gas is directed is selected from the group consisting of a fuel injector assembly, and an air cleaner assembly for intake into a carburetor.

13. The method of claim 11, wherein the place away from said crankcase to which said by-product gas is directed is a catalytic converter.

14. A method for controlling oxidative degradation of an engine oil in a crankcase of an internal combustion engine and delivering oxygen to a place away from said crankcase, which comprises providing said engine; providing said engine oil to said crankcase; providing a membrane-containing device for separation of air to supply an inert gas blanket of a gas enriched with nitrogen in comparison to air, which separates nitrogen and oxygen from the air to provide said inert gas blanket and provide a by-product gas enriched in oxygen; providing a means for directing said inert gas blanket to said crankcase; under overpressure conditions, blanketing said engine oil in said crankcase with said inert gas blanket to control oxidative degradation of said engine oil; and providing a means for directing said by-product gas to the place away from said crankcase.

15. A method for controlling oxidative degradation of a transmission fluid in a transmission and delivering oxygen to a place away from said transmission, which comprises providing said transmission; providing said transmission fluid to said transmission; providing a means for supplying an inert gas blanket of a gas enriched with nitrogen in comparison to air, which separates nitrogen and oxygen from the air to provide said inert gas blanket and provide a by-product gas enriched in oxygen; providing a means for directing said inert gas blanket to said transmission, and blanketing said transmission fluid in said transmission with said inert gas blanket to control oxidative degradation of said transmission fluid; and providing a means for directing said by-product gas to the place away from said transmission.

16. The method of claim 15, wherein the place away from said transmission to which said by-product gas is directed is selected from the group consisting of a fuel injector assembly, and an air cleaner assembly for intake into a carburetor.

17. The method of claim 15, wherein the place away from said transmission to which said by-product gas is directed is a catalytic converter.

18. A method for controlling oxidative degradation of an oleaginous liquid substance in a generally enclosed, vented space in a working machine, which comprises providing said working machine having said space; providing said oleaginous liquid substance; and blanketing said oleaginous liquid substance in said space with an inert gas blanket to control oxidative degradation of said oleaginous liquid substance, wherein said inert gas of said inert gas blanket is provided from separation of air with a membrane-containing device.

19. The method of claim 18, wherein gas enriched with nitrogen provides said inert gas blanket, and by-product gas enriched with oxygen is delivered for consumption to a location selected from the group consisting of a part of the machine other than said enclosed space, and a passenger cabin space.

* * * * *